UNITED STATES PATENT OFFICE.

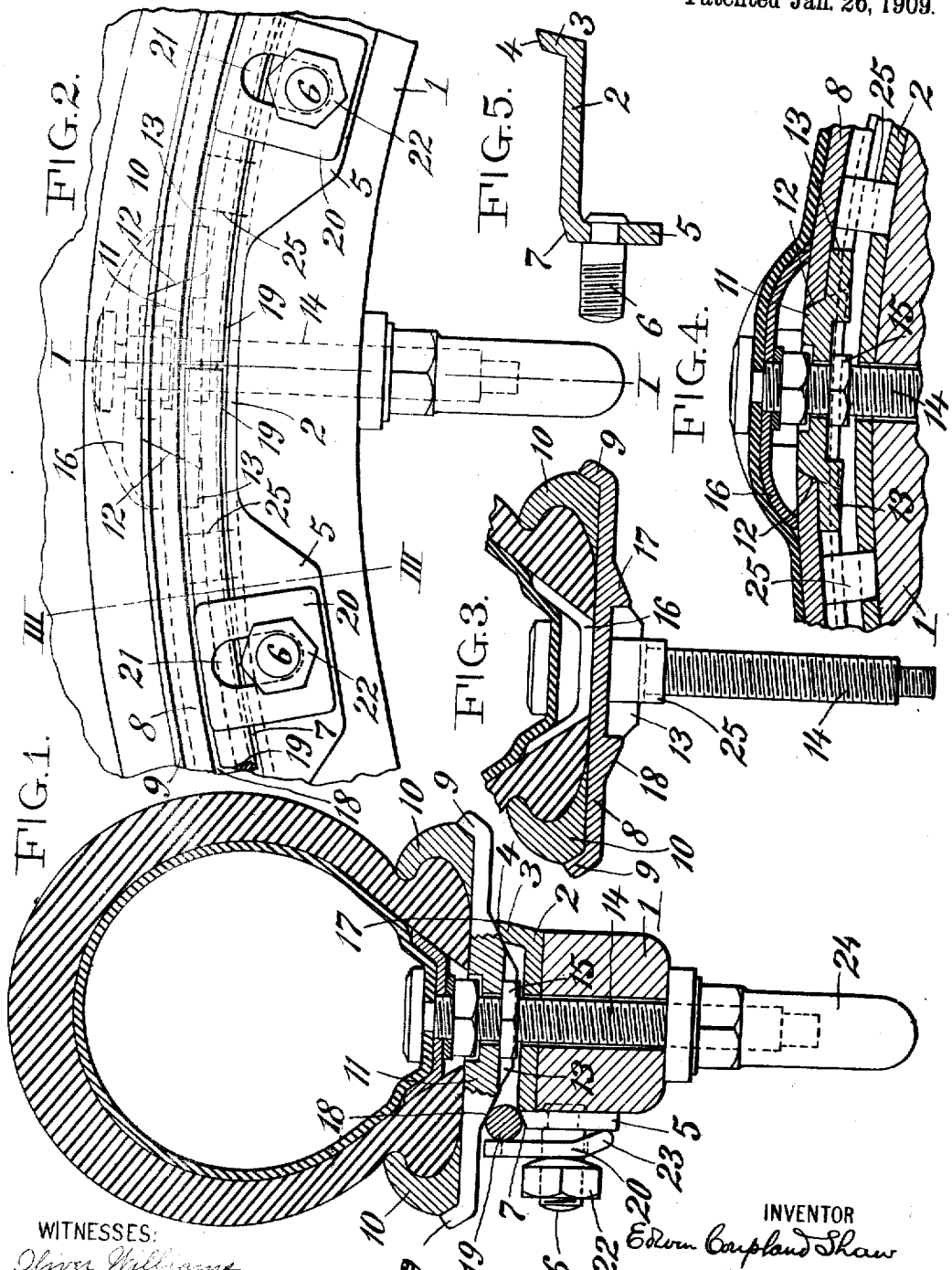

EDWIN COUPLAND SHAW, OF AKRON, OHIO, ASSIGNOR TO THE B. F. GOODRICH COMPANY, OF AKRON, OHIO, A CORPORATION OF OHIO.

VEHICLE-WHEEL RIM.

No. 910,869.

Specification of Letters Patent.  Patented Jan. 26, 1909.

Application filed May 25, 1907. Serial No. 375,718.

*To all whom it may concern:*

Be it known that I, EDWIN COUPLAND SHAW, a citizen of the United States, and a resident of the city of Akron, in the county of Summit, State of Ohio, have invented certain new and useful Improvements in Vehicle-Wheel Rims, of which the following is a specification, reference being had to the drawings forming a part thereof.

My invention relates to that class of vehicle wheel rims shown and described in my applications, Serial Nos. 375,715 and 375,716, filed of even date herewith, and is for a modification of the general form of structure therein claimed. As stated in the above named cases, rims of this character comprise generally speaking, a rim fixed to the felly and a detachable rim capable of being easily removed from or attached to the fixed rim and provided with means for readily engaging or disengaging a tire. The combination of these two means in one device is of special advantage. More specifically this invention contemplates the provision of a split removable rim combined with detachable annular tire retaining flanges, the rim being capable of contraction to free it from the flanges and of expansion to cause it to clamp the flanges and hold itself, the flanges, and the tire, in a unitary self-contained structure, in which the tire may be inflated and the whole carried from place to place ready to be immediately substituted for a damaged tire whenever necessary. Means are also provided in the shape of a locking-ring which may be retained in place by a keeper for holding the two rims in engagement. This modification contemplates a special form of keeper which may be slipped to one side to disengage the locking-ring without entirely removing the nut which holds the keeper in place. This simplifies and facilitates the removal of the detachable rim and maintains the elements of the fixed rim and attached parts in semi-assembled condition. It is to be understood however that the invention is not limited to the specific forms selected for purposes of illustration, but that the different parts may be freely modified so long as their several functions are performed relatively to each other without altering the effective combination of elements.

In the drawings Figure 1 is a transverse section of a felly, rim and tire taken on the line I—I of Fig. 2, and showing a construction embodying my invention. Fig. 2 is a side elevation of a fragment of the felly, rim and tire shown in Fig. 1. Fig. 3 is a section of the foot of the tire and of the detachable rim taken on a line corresponding to line III—III of Fig. 2. Fig. 4 is a central longitudinal vertical section of a portion of the detachable rim and felly showing the valve stem of the tire. Fig. 5 is a transverse section of the fixed rim showing one of the keeper holding studs.

Referring to the drawings by reference numerals, 1 is the felly to which is permanently secured in any suitable manner the fixed rim 2. This rim has a continuous upstanding flange 3 provided with an inclined upper face 4. On the opposite edge of the rim from the flange 3 are provided a number of downwardly projecting ears or flanges 5 which fit close to the side of the felly. These ears are each provided with a short screw threaded stud 6 for a purpose to be hereinafter set forth. The side of the fixed rim which carries the ears is provided with a face 7 inclined in the same direction as face 4. The tire is carried by a detachable rim 8. This rim is provided with upstanding flanges 9 for holding the annular tire retaining flanges 10. The rim 8 is a split rim and is capable of being expanded and contracted. When contracted the flanges 10 which are endless can be slipped over the rim flanges 9 and the tire can be easily removed. In this illustration I have shown the detachable flanges 10 as shaped to hold a clencher tire, but it is obvious that by properly forming them, any other form of tire may be used. In order to hold the ends of the split detachable rim in proper position when in operation, a key piece 11 is used which may be of the form described and claimed in my application, Serial No. 375,717, filed of even date herewith. A key piece of this form has inclined end faces 12 which engage with the inclined ends of the detachable split rim. The key piece is also provided with projecting lugs 13 which take under the ends of the split rim. The key piece is provided with an opening to fit over the valve stem 14, and is held in place by a nut 15 on the valve stem. The valve stem also carries a clip of usual form 16. On the lower surfaces of the detachable rim are a pair of oppositely inclined faces 17 and 18. The face 17 engages the similarly inclined face 4 on the fixed rim, but faces 18 and 7 being oppositely inclined, leave a V-shaped opening between them. In this opening is fitted a locking-ring 19 which holds the two rims in proper relation. This ring is held in position by keepers 20 of which there may be any desired number. These keepers 20 are each provided with an elongated slot 21 to fit over the studs 6 before referred to. Spherical faced nuts 22 are screwed on these studs and force the keepers against the locking ring 19. The keepers 20 are provided with inwardly bent lower edges 23. It is obvious that bolts extending through the felly from side to side may be substituted for the studs carried by the ears if desired. A dust cap 24 of usual form is screwed on the inner end of the valve stem. The detachable rim may be provided with lugs 25 engaging slots in the fixed rim to prevent longitudinal creeping of the detachable rim.

The operation of the device is as follows: If the parts are dis-assembled and it is desired to put on the tire, the ends of the detachable rim are drawn together and lapped over each other if necessary, thus reducing the diameter of the detachable rim sufficiently to permit one of the flange rings 10 to be slipped into position. The tire is then slipped over the detachable rim and fitted to the flange ring. The other flange ring is then put in place and the detachable rim expanded until it closely engages the inside of the flange rings and tire. The key piece is then put in place and by screwing up the nut 15, the key piece and clip 16 are drawn together locking the ends of the detachable rim in fixed expanded position. The tire can now be inflated and the tire and detachable rim being firmly fixed together can be directly attached to the fixed rim and felly or carried about ready for emergency. To apply the detachable rim to the fixed rim the valve stem is first inserted in its opening in the wheel and the detachable rim then slipped into place with its face 17 in engagement with the face 4 of the flange 3. The locking ring 19 is then inserted in the V shaped groove between the faces 7 and 18 and the keepers brought into place against the locking ring. By the use of the slotted keeper, it will be seen it is only necessary to loosen the nuts 22 slightly when the keepers can be slipped inwardly until the bent edges 23 lie below the ears 5 when the keepers will be entirely free from the locking ring 19 and it can be removed. Then when the locking ring is in place again, it is only necessary to slide the keepers up in engagement with it and tighten the nuts slightly. This saves a great deal of screwing and unscrewing of the nuts and also makes it impossible to mislay or lose the nuts and keepers. A great saving of time in changing tires is thus effected, a matter which is often of the very greatest importance as in races.

Having thus described my invention, I claim:

1. In a vehicle wheel in combination, a felly, a fixed rim, a detachable rim, a locking ring for holding said rims in engagement, and slotted keepers for retaining said locking ring in place.

2. In combination in a vehicle wheel, a felly, a fixed rim, a split detachable rim, means carried by the detachable rim for engaging a tire, a locking ring and slotted keepers for holding said locking ring in place.

3. In combination in a vehicle wheel, a fixed rim having an upstanding flange at one edge, the upper face of said flange being inclined, a similarly inclined face at the other edge of said rim, a split detachable rim carrying tire-engaging means, said rim being provided with oppositely inclined faces, one of said faces engaging the inclined face on the upstanding flange, and the other face lying opposite to the inclined face on the other edge of the fixed rim, a locking ring adapted to engage said last two faces, studs projecting from said fixed rim and radially slotted keepers mounted on said studs and engaging the locking ring.

4. In combination in a vehicle wheel, a felly, a fixed rim attached to said felly and provided at one side thereof with downwardly projecting ears, studs carried by said ears and projecting laterally, a detachable rim adapted to slide over said fixed rim, a locking ring for holding said detachable rim in place, keepers having inwardly bent lower edges and provided with radially disposed slots adapted to fit over said studs, the upper ends of said keepers adapted to engage with the locking ring and retaining nuts mounted on the ends of said studs.

EDWIN COUPLAND SHAW.

Witnesses:
ARTHUR E. DAVISON,
WALTER K. MEANS.